United States Patent
Lucidarme et al.

(10) Patent No.: US 6,785,535 B2
(45) Date of Patent: Aug. 31, 2004

(54) METHOD FOR MONITORING COMMUNICATIONS IN A CELLULAR RADIOCOMMUNICATION SYSTEM, AND NETWORK CORE THEREFOR

(75) Inventors: Thierry Lucidarme, Montigny-le-Bretonneux (FR); Philippe Duplessis, Colombes (FR)

(73) Assignee: Nortel Networks Limited (CA)

( * ) Notice: Subject to any disclaimer, the term of this patent is extended or adjusted under 35 U.S.C. 154(b) by 0 days.

(21) Appl. No.: 10/297,775

(22) PCT Filed: May 18, 2001

(86) PCT No.: PCT/FR01/01538

§ 371 (c)(1),
(2), (4) Date: May 13, 2003

(87) PCT Pub. No.: WO01/95657

PCT Pub. Date: Dec. 13, 2001

(65) Prior Publication Data

US 2003/0186678 A1 Oct. 2, 2003

(30) Foreign Application Priority Data

Jun. 6, 2000 (FR) .............................. 00 07255

(51) Int. Cl.[7] ...................... H04M 11/00; H04M 15/00; H04Q 7/24

(52) U.S. Cl. ...................... 455/406; 455/403; 455/408; 379/114.01; 379/126; 370/338; 370/352

(58) Field of Search ............................... 455/3.01, 3.04, 455/403, 405, 406, 408, 422.1, 424, 432.1; 379/114.01, 114.07, 121.01, 121.05, 126, 127.01, 127.06, 133, 134, 135; 370/338, 401, 352, 349, 397, 546

(56) References Cited

U.S. PATENT DOCUMENTS

| | | | | | |
|---|---|---|---|---|---|
| 6,463,275 | B1 | * | 10/2002 | Deakin | 455/406 |
| 6,480,485 | B1 | * | 11/2002 | Kari et al. | 370/352 |
| 6,496,690 | B1 | * | 12/2002 | Cobo et al. | 455/408 |
| 6,721,554 | B2 | * | 4/2004 | Gnesda et al. | 455/406 |
| 2002/0191575 | A1 | * | 12/2002 | Kalavade et al. | 370/338 |
| 2003/0051041 | A1 | * | 3/2003 | Kalavade et al. | 709/229 |

FOREIGN PATENT DOCUMENTS

EP 0766427 4/1997

OTHER PUBLICATIONS

3G TS 32.015 V3.1.1 (Mar. 2000), 3rd Generation Partnership Project; Technical Specification Services and System Aspects; GSM call and event data for the packet switched domain, Release 1999.

* cited by examiner

Primary Examiner—Binh Tieu
(74) Attorney, Agent, or Firm—Piper Rudnick LLP

(57) ABSTRACT

The invention concerns a cellular radiocommunication system comprising a network core (21) including switches (28, 30, 32), one or several gateways (28, 32) to external networks, subscriber management means (33) and billing management means (34, 35). Several radio access networks (22, 40), including each base stations (24, 42) capable of radio communication with mobile stations (23), are connected to the network core switches. Said radio access networks include an access network (22) managed with the network core by a cellular operator and at least an additional access network (40) having a substantially less extensive radio coverage and a substantially wider bandwidth than the one managed by the cellular operator. When setting up a communication with a mobile station through the network core and one of the access networks, a report message is generated specifying the access network concerned.

9 Claims, 3 Drawing Sheets

METHOD FOR MONITORING COMMUNICATIONS IN A CELLULAR RADIOCOMMUNICATION SYSTEM, AND NETWORK CORE THEREFOR

The present invention concerns the management of cellular radiocommunication networks.

In conventional telecommunications systems, consisting of a set of interconnected networks, each of these networks being managed by a single operator, each network gathers information on each service provision to a subscriber, in order to calculate billing data. The gathered information is then sorted based on the subscriber's identity, in order to debit the subscribers or organizations responsible for debiting a subset of subscribers.

Wireless systems are examples of such interconnected networks. One special feature is that under certain conditions a network subscriber may occasionally use the resources of another network. This is called roaming.

Assuming that a subscriber of a network A, located within the coverage of another network B, makes a call or performs any other billable telecommunications transaction, network B records the information on this transaction with a subscriber identification, which in particular indicates his/her home network. Network B sorts these records based on subscriber identities, and it builds a file for network A, which in particular includes the record concerning the roaming subscriber.

If the interconnected networks A and B mutually call upon their resources to route traffic, each network records data describing the traffic to the other network, and cross billing is carried out by comparing the traffic exchanged without referring to the subscribers' identities. This situation is typically that of international telephone traffic.

This situation is also that of the interoperation of a private network with a public network. The public operator measures the traffic exchanged at a gateway between the two networks, and bills the private operator on this basis.

If network B belongs to a hierarchically higher layer than network A (e.g. A is a regional telephone company and B is the national operator), network A uses the resources of network B to route these communications. The operator of network A must then pay for the routing services provided by network B.

In the field of cellular radiocommunication networks, the ETSI (European Telecommunications Standard Institute) has suggested interconnecting large coverage cellular public land mobile networks (PLMN) with broadband radio access networks (BRAN).

The BRAN is typically a wireless local area network (WLAN) which can be of the HiperLAN/1 or HiperLAN/2 type according to ETSI standards. These HiperLAN networks are short range and operate in frequency bands around 2.4 or 5.2 GHz. The ETSI recommends convergence protocols above the HiperLAN/2 protocols, for connecting these WLANs with more extensive networks, in particular cellular networks.

The aim is to allow WLAN subscribers to take advantage of the services offered by the cellular network.

There are similar WLAN standards in the United States, namely standards IEEE 802.11 b and IEEE 802.11 a.

An object of the present invention is to organize interoperation between a cellular network and WLANs such that subscribers of the cellular network may use the broadband resources of the WLAN.

The invention thus proposes a method for monitoring communications in a cellular radiocommunication system comprising a core network including switches, at least one gateway to an external network, subscriber management means and billing management means, as well as a plurality of radio access networks connected to the core network switches, each including base stations capable of radio communication with mobile stations. The radio access networks include a first access network managed with the core network by a cellular operator and at least one second access network having a substantially less extensive radio coverage and a substantially wider bandwidth than the first access network. During a communication with a mobile station through the core network and one of the access networks, at least one report message is generated including an identification of said access network independent of the identities associated with the mobile station.

Thus, a user registered in the network managed by the cellular operator can use the resources of the second BRAN type access network to benefit from the very wide spectrum offered by the BRAN and thus access the broadband services offered by the external networks (e.g. IP networks) connected to the core network. This can be used to increase the capacity of public access to the cellular network.

The BRAN manager can be remunerated by the cellular operator for the access service that it provides. This is implemented simply by enhancing the report messages circulating in the core network. Various management methods may then be applied between the cellular operator and the BRAN manager in order to remunerate the latter. This remuneration may help financing the cost of installing the BRAN.

Another aspect of the present invention relates to a cellular radiocommunication system core network comprising switches, at least one gateway to an external network, subscriber management means and billing management means, the switches being connected to a plurality of radio access networks each including base networks capable of radio communication with mobile stations, the radio access networks including a first access network managed with the core network by a cellular operator and at least one second access network having a substantially less extensive radio coverage and a substantially wider bandwidth than the first access network, the core network comprising means for generating at least one report message during a communication with a mobile station through the core network and one of the access networks, which access network is identified in the report message independently of the identities associated with the mobile station.

Other features and advantages of the present invention will appear in the following description of non-restrictive examples of implementation, referring to the attached drawings, in which.

Figure 1:
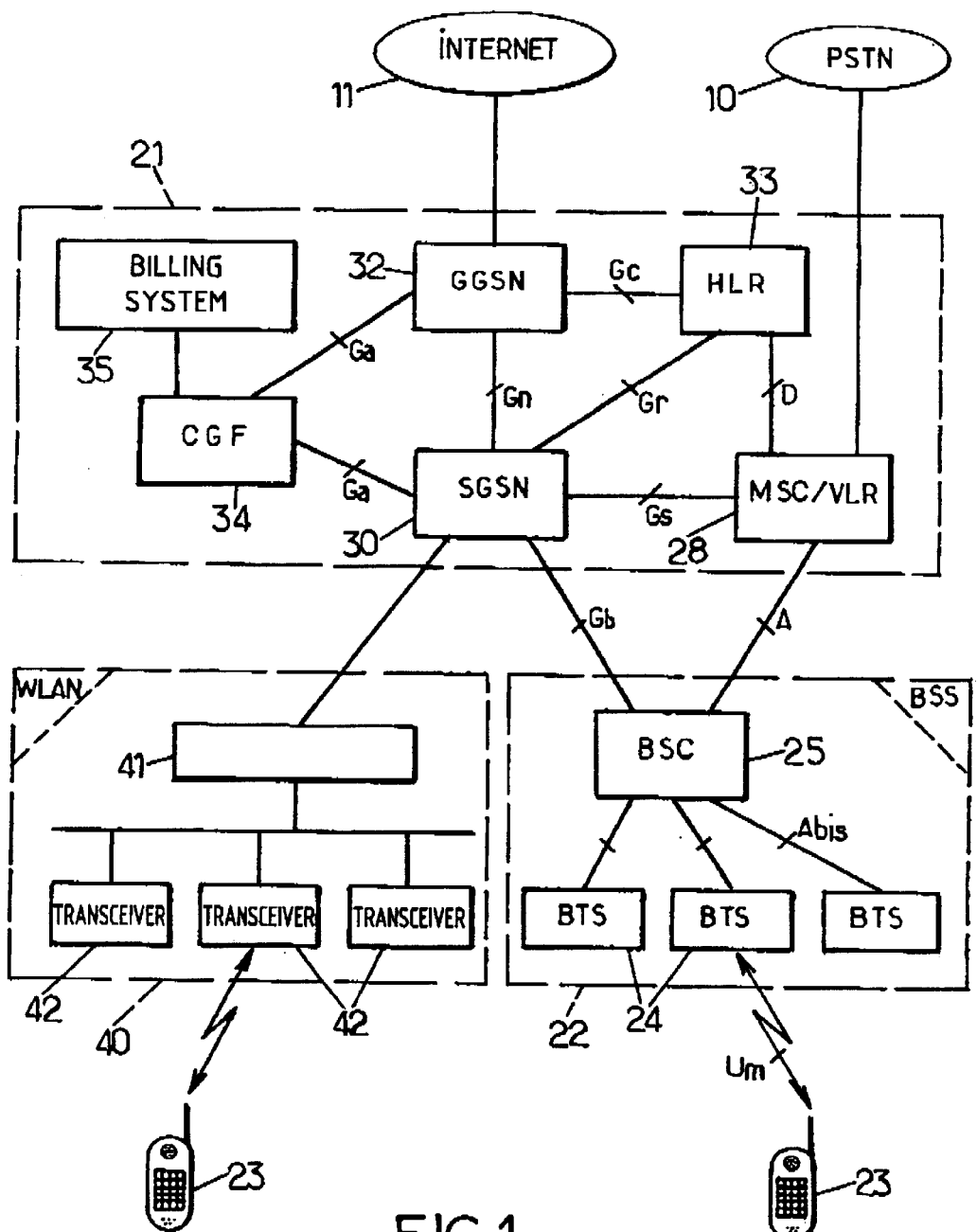
FIG. 1 is a general diagram of a cellular radiocommunication system architecture to which the invention can be applied.

The cellular radiocommunication system shown in FIG. 1 comprises a cellular network with extensive coverage, e.g. national, managed by a general public operator.

This PLMN is conventionally divided into a core network 21, comprising interconnected switches, and an access network 22 providing the radio links with the mobile radio terminals 23.

In the example shown, the PLMN is a second generation network of the GSM type (Global System for Mobile communications). It incorporates a GPRS (General Packet Radio Service) type packet transmission service. In the GSM, the access network 22, called a BSS (Base Station Subsystem), is composed of base transceiver stations (BTS) 24 distributed over the network coverage area for communicating by radio (Um interface) with mobile terminals 23, and base station controllers (BSC) 25 connected to the core network 21 and each monitoring the base stations 24 via so-called Abis interfaces.

Of course, the invention is applicable to other types of PLMN, especially to third generation networks of the UMTS (Universal Mobile Telecommunications System) type.

The core network 21 is connected to fixed networks comprising a public switched telephone network (PSTN) 10 and one or more packet transmission networks using respective protocols (PDP, Packet Data Protocol) such as X.25 or IP (Internet Protocol). In the example illustrated by the drawings, there is a packet transmission network 11 consisting of the Internet.

The core network 21 comprises mobile switching centers 28 (MSC) combined with visitor location registers (VLR). These MSCs 28 ensure circuit switching for circuit mode telephone or data transfer communications. Some MSCs act as a gateway with the fixed networks, especially with the switched network 10. Each BSC 25 is connected to one or more MSCs 28 via an interface A.

For the packet mode, the core network switches 21 are called GSN (GPRS Support Nodes), and they communicate with each other via a so-called Gn interface.

The packet switches 30 connected to the BSCs 25 of the access network 22 via a Gb interface are referred to as SGSN (Serving GSN). Some of them can communicate with MSCs via a Gs interface for coordinating mobility between the circuit and packet modes.

Other packet switches 32 of the core network 21, called GGSN (Gateway GSN), act as a gateway with the packet networks, in particular with the Internet 11. These gateways 32 are connected to the SGSNs 30 to enable mobile terminals 23 to access the Internet.

The core network 21 comprises a home location register 33 (HLR) communicating with the MSC/VLR, SGSN and GGSN through standardized interfaces respectively called D, Gc and Gr. The HLR is a database, located in one or more places, containing all the data specific to the subscribers of the PLMN, chiefly their subscription, mobility and context details, in order to enable all the service requests relating to these subscribers to be processed. The core network 21 may further comprise other units not shown in FIG. 1: short message servers (SMS), terminal registers (EIR), etc.

Figure 2:
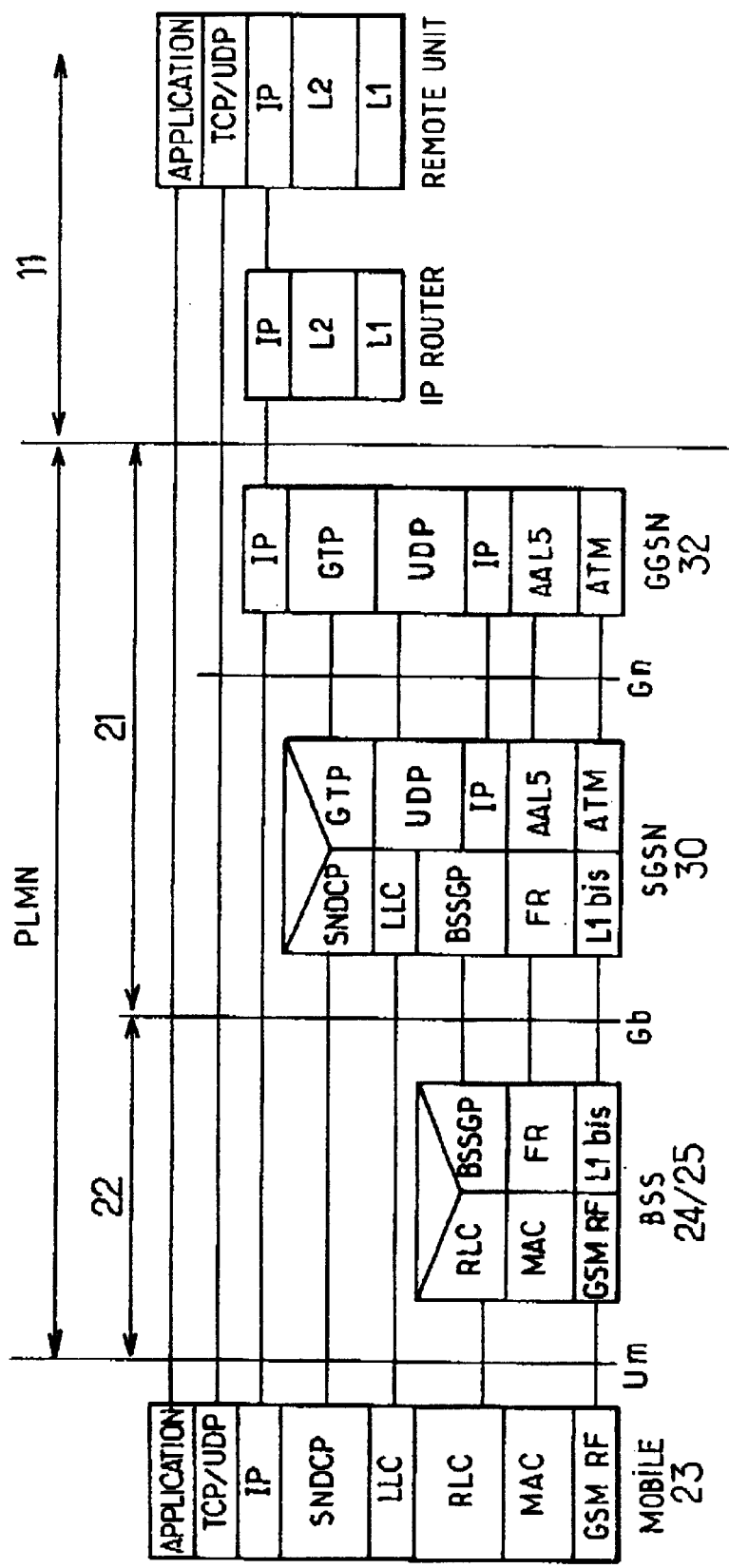
FIGS. 2 and 3 are diagrams illustrating communications protocol stacks used in system entities of FIG. 1.
Figure 3:
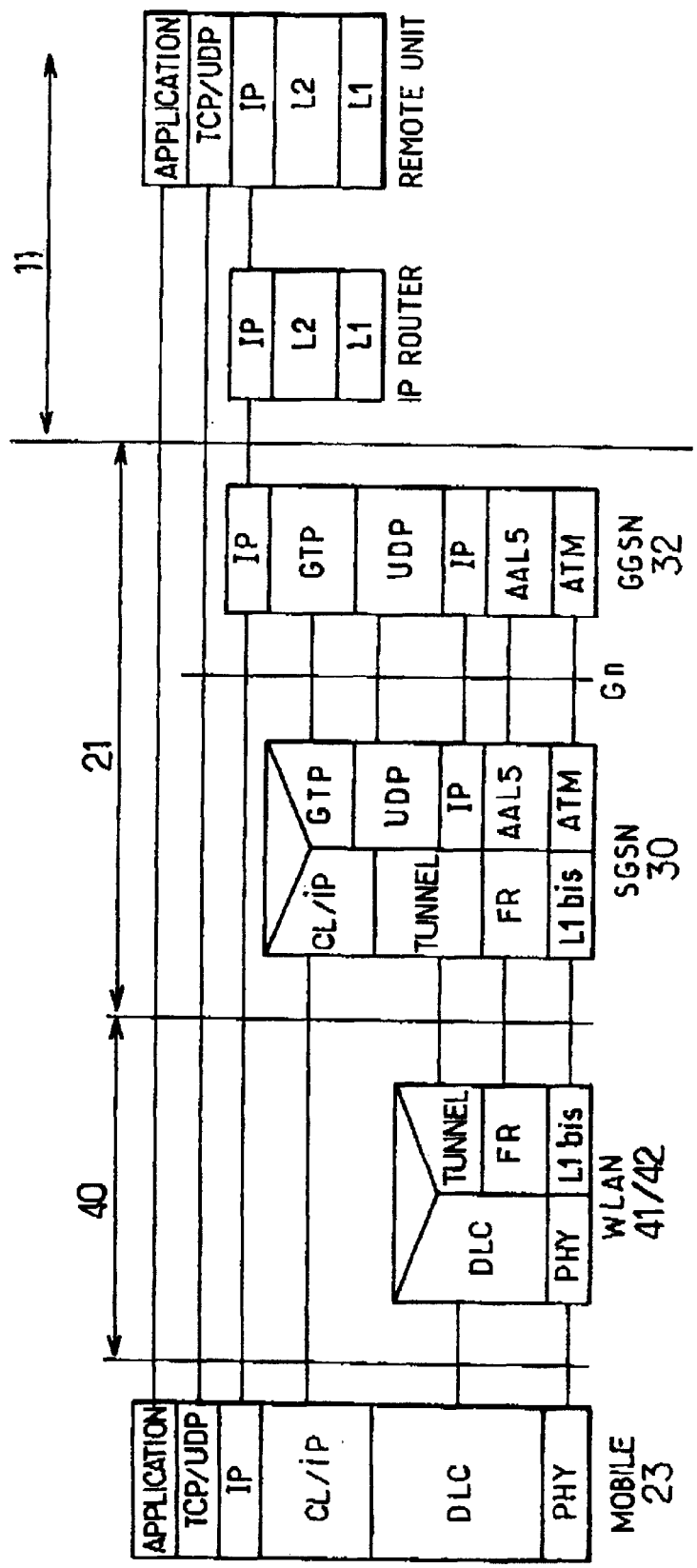

FIGS. 2 and 3 are illustrations of the protocols capable of being used in packet mode communications between a mobile terminal 23 and a remote unit such as an IP server or a user terminal accessible via one or more IP routers belonging to the Internet network. In the Internet network 12, above layers 1 and 2 of the OSI model (L1, L2), IP is used as the network protocol. A corresponding IP layer is present in the mobile terminals 23 when they access the Internet. This access may take place during TCP (Transmission Control Protocol) sessions, or by UDP (User Datagram Protocol) datagram exchange, to enable applications run on the mobile 23 and the remote unit to exchange data.

The GPRS protocols used in the PLMN are described in GSM Recommendations 03.60, 03.64, 08.16 and 09.61 published by the ETSI (European Telecommunications Standards Institute). Additional IP and UDP layers, together with a GTP (GPRS Tunneling Protocol, see technical specification 3G TS 29.060, version 3.4.0 published in March 2000 by the 3GPP ($3^{rd}$ Generation Partnership Project)) protocol layer, are present at the Gn interface, between the layer 2 and the IP layer corresponding to that of the mobile terminal 23. This Gn interface can be carried by ATM (Asynchronous Transfer Mode) connections, with an AAL5 type layer 2.

The IP datagrams exchanged by the mobile terminal 23 are encapsulated in data units of the SNDCP protocol (Sub-Network Dependent Convergence Protocol) which is above the LLC (Link Layer Control) protocol handling the addressing in packets transmitted over the radio interface. The SGSN relays between the GTP and SNDCP protocols for transmitting these datagrams in the core network and to the BSS.

The BSS 22 uses the BSSGP protocol (BSS Gateway Protocol) on the Gb interface, above the LLC layer to which it is transparent. This Gb interface can use the frame relay (FR) technique. GSM radio protocols are employed in the layer 1 on the Um interface, and MAC (Medium Access Control) and RLC (Radio Link Control) protocols in the layer 2.

The invention relates to the supply of useful data for the billing methods implemented in the core network. In the rest of the present description, it is presented in its application to packet mode data transmissions (GPRS), without this being restrictive.

In addition to the elements previously stated, the core network 21 comprises one or more entities 34 called CGF (Charging Gateway Function) taking part in the billing functions in the GPRS network. On this subject, reference can be made to technical specification 3G TS 32.015, version 3.1.1 published in March 2000 by the 3GPP. The standardized interface between the GSNs and the CGF is referred to as Ga. A CGF entity 34 may be incorporated into a GGSN or SGSN, or form a separate unit. It is connected to the billing system 35 used by the PLMN operator.

Billing is based on report messages called CDR (Call Detail Report) originating from the GSNs, collected in real time by the CGF and supplied to the billing system by the CGF after possible pre-processing. Based on these CDRs, the PLMN operator controls the billing for its subscribers and the external operators, according to his own management methods.

A message called an S-CDR is opened in the SGSN at the activation of each context of the PDP concerning a terminal 23. Information is added to the S-CDR when certain events occur such as an alteration in quality of service or change in charging time slot. The S-CDR is closed and delivered to the CGF when the PDP context is completed in the SGSN for the subscriber. This time-stamped message indicates the identity of the subscriber (IMSI, International Mobile Subscriber Identity) and in particular contains the following data gathered by the SGSN:

quantities of data transmitted over the radio interface from and to the terminal, indicating the qualities of service and user protocols;

use of GPRS resources, especially regarding the mobility of the terminal;

duration of use of the PDP addresses;

indication of the terminal home PLMN, and of the visited PLMN in the case of inter-PLMN mobility (roaming), and where necessary more precise location of the subscriber at the moment of creation of the S-CDR.

The SGSN may produce another message called an M-CDR for including the data linked to mobility management protocols.

The GGSN serving the terminal may, in particular, gather the following information which it similarly inserts in a G-CDR message addressed to the CGF:

source and destination addresses;

use of external data networks;

duration of use of the PDP addresses.

The CGF 34 records the S-CDR, M-CDR and G-CDR messages delivered by the GSNs, and may possibly perform certain operations: filtering, merging, pre-processing with a view to billing, etc. It transfers the CDR data to the billing system 35, which carries out the accounting processing.

In the system shown in FIG. 1, one or more wireless local area networks (WLAN) are connected to one or more SGSNs 30 of the core network 21.

The WLAN 40 offers a much larger bandwidth than that offered by the BSS 22. But it is a short range local area network, whereas the BSS is an extensive network, with national coverage for example.

By way of example, the WLAN 40 can be of the HiperLAN/2 type. It comprises a gateway 41 connected to the SGSN 30 and a set of transceivers 42 distributed in an area covered by the WLAN, which typically corresponds to one or more buildings.

Mobile terminals 23 held by subscribers of the PLMN 21, 22 (or of any other PLMN with which there are roaming agreements) may, if they are multimode terminals, also communicate through the WLAN 40. A multimode terminal incorporates the communications protocols used in the cellular network (FIG. 2), as well as those used in the WLAN. Of course, a subscriber can also own several terminals compatible with different radio access networks.

FIG. 3 illustrates different protocols capable of taking part in an exchange of data between the Internet network 11 and a multimode mobile terminal 23 via the WLAN 40. These protocols are largely identical to those in is FIG. 2. In the example shown, the interface between the core network 21 and the WLAN 40 is also of the frame relay (FR) type, with a tunnel protocol functionally similar to BSSGP for carrying the protocol data units of the convergence layer between the HiperLAN/2 and IP (CL, Convergence Layer). The SGSN 30 performs the necessary translations for transmitting the IP packets transparently according to the GTP protocol in the core network and according to the CL protocol to the access network.

The HiperLAN/2 system considered as an example for the operation of the WLAN 40 uses a physical layer (PHY) based on the OFDM (Orthogonal Frequency Division Multiplexing) technique. The WLAN 40 and the mobile terminal 23 also incorporate a level 2 layer called DLC (Data Link Control) incorporating MAC- and RLC-type sub-layers. The convergence protocol data units are transmitted transparently by the WLAN 40, in encapsulated form in DLC protocol data units over the radio interface, and by means of the tunnel protocol over the interface with the core network 21.

When a mobile terminal communicates in this way, using the radio access resources of the WLAN 40, the SGSN 30 inserts an identification of the access network used into the S-CDR message, which it can simply deduce from the physical port used for the communication to the mobile. When access is effected by means of the BSS managed by the cellular operator, the SGSN may include an indication of the same nature in the S-CDR, or the BSS may be treated as the default access network.

Based on the access network indications used, the billing system 35 has accounts drawn up for calls made via the WLAN 40, for example with a view to a reversion from the cellular operator to the WLAN manager.

The WLAN manager thus acts as an alternative operator.

The same WLAN may possibly be associated in this way with several core networks managed by different operators.

For identifying the access network in the CDR message, a special field reserved for this purpose may be provided. Otherwise, fields already specified in the standard may be used, for example the "cell identity" field specified in section 6.1.1. of the aforementioned specification 3G TS 32.015.

Provision may also be made for the gateway 41 of the WLAN to be adapted for measuring the traffic exchanged with the SGSN 30, in order to effect local accounting and/or to supply the information requested for setting up the CDR in the core network 21.

What is claim is:

1. Method for monitoring communications in a cellular radiocommunication system, the radiocommunication system comprising a core network including switches, at least one gateway to an external network, subscriber management means and billing management means, the radiocommunication system further comprising a plurality of radio access networks connected to the core network switches, each radio access network including base stations capable of radio communication with mobile stations, wherein the radio access networks include a first access network managed with the core network by a cellular operator and at least one second access network having a substantially less extensive radio coverage and a substantially wider bandwidth than the first access network, the method comprising the step of generating, during a communication with a mobile station through the core network and one of the access networks, at least one report message including an identification of said access network independent of the identities associated with the mobile station.

2. Method according to claim 1, wherein said report message is generated within a switch of the core network and transmitted to the billing management means.

3. Method according to claim 1, wherein the first and second access networks operate in different frequency bands.

4. Method according to claim 1, wherein the second access network comprises a wireless local area network used for further supplying communication links independent of the core network.

5. Core network for a cellular radiocommunication system, the core network comprising switches connected to a plurality of radio access networks, at least one gateway to an external network, subscriber management means and billing management means, each radio access network including base stations capable of radio communication with mobile stations, the radio access networks including a first access network managed with the core network by a cellular operator and at least a second access network having a substantially less extensive radio coverage and a substantially wider bandwidth than the first access network, the core network further comprising means for generating at least one report message during a communication with a mobile station through the core network and one of the access networks, which access network is identified in the report message independently of the identities associated with the mobile station.

6. Core network according to claim 5, wherein the means for generating the report messages are located in switches that transmit said messages to the billing management means.

7. A method of managing communications whereby users access resources of a telecommunications network through facilities of one of a plurality of access networks, the method comprising the steps of:

generating report messages for said communications, wherein said report message includes, for at least some of the communications, an identifier of the access network through which the user accesses resources of said telecommunications network;

processing the report messages to bill the users; and further processing the access network identifiers included in the report messages to provide remuneration of a manager of at least one of said access networks from a manager of said telecommunications network.

8. The method as claimed in claim 7, wherein said telecommunications network uses the IP protocol.

9. The method as claimed in claim 7, wherein the access networks include at least one wireless LAN.

* * * * *